United States Patent Office

3,702,148
Patented Nov. 7, 1972

3,702,148
MACHINE FOR THE DEPOSITION OF MEASURED AMOUNTS OF SOFTENED THERMOPLASTIC MATERIAL INTO CLOSURE CAPS
Ettore Busi, 191 Via Selice, Imola, Italy
Filed Sept. 9, 1970, Ser. No. 70,719
Claims priority, application Italy, Sept. 16, 1969, 7,317/69
Int. Cl. B65b 3/10
U.S. Cl. 141—67                    7 Claims

ABSTRACT OF THE DISCLOSURE

This invention relates to a machine for depositing measured amounts of softened thermoplastic materials into closure caps to provide linings in the caps. This machine includes a metering and a delivering device for viscous or softened plastics lumps, and a suction gripper mounted for cyclic movement along a closed path and arranged for connection to a vacuum pipe for reception of one of the plastics lumps delivered by said metering device and for subsequent connection to a blast air pipe for discharging the plastics lump into a closure cap.

BACKGROUND OF THE INVENTION (1) Field of the invention

The invention relates to a machine for the deposition of measured amounts of softened thermoplastic material into closure caps, particularly in the production of plastics linings in such caps.

(2) Description of the prior art

In the production of thermoplastic linings in closure caps a determined amount of molten, that is to say softened, plastically deformable thermoplastic material must be introduced into each individual cap and then pressed to form a lining for the latter. In this process it is important that the amount of plastics material introduced into each individual closure cap should be accurately metered, in order to avoid during the pressing on the one hand the formation of an incomplete lining and on the other hand the overflowing of the plastics material over the edge of the cap. The accurate metering and the handling of such small amounts of molten, that is to say viscous or softened plastics material nevertheless give rise to fairly considerably technical difficulties, which cannot be satisfactorily overcome with previously known machines or apparatus. Consequently, either inaccurately metered amounts of plastics material, that is to say too large or too small amounts of plastics material are introduced into the closure caps, or inaccuracy frequently occurs in the introduction of the plastics material into the closure cap, that is to say the plastics material is either introduced with considerable eccentricity into the cap or even drops outside the latter.

SUMMARY

According to the invention a machine for inserting metered amounts of molten thermoplastic materials into closure caps comprises a metering and delivery device for viscous or softened plastics lumps, at least one suction gripper mounted for cyclic movement along a closed path between a first position at which the gripper is disposed above said metering and delivery device and a second position at which the gripper is disposed centrally above an empty closure cap, the hollow side of which is directed upwards, a vacuum pipe which communicates with the gripper when the gripper is in the region of said first position for effecting reception by the gripper of one of said plastics lumps delivered by said metering device, and a blast air pipe which communicates with the gripper when the gripper is in the region of said second position for the purpose of discharging the said one plastics lump into the closure cap.

DESCRIPTION OF THE PREFERRED EMBODIMENT

Figure 1:
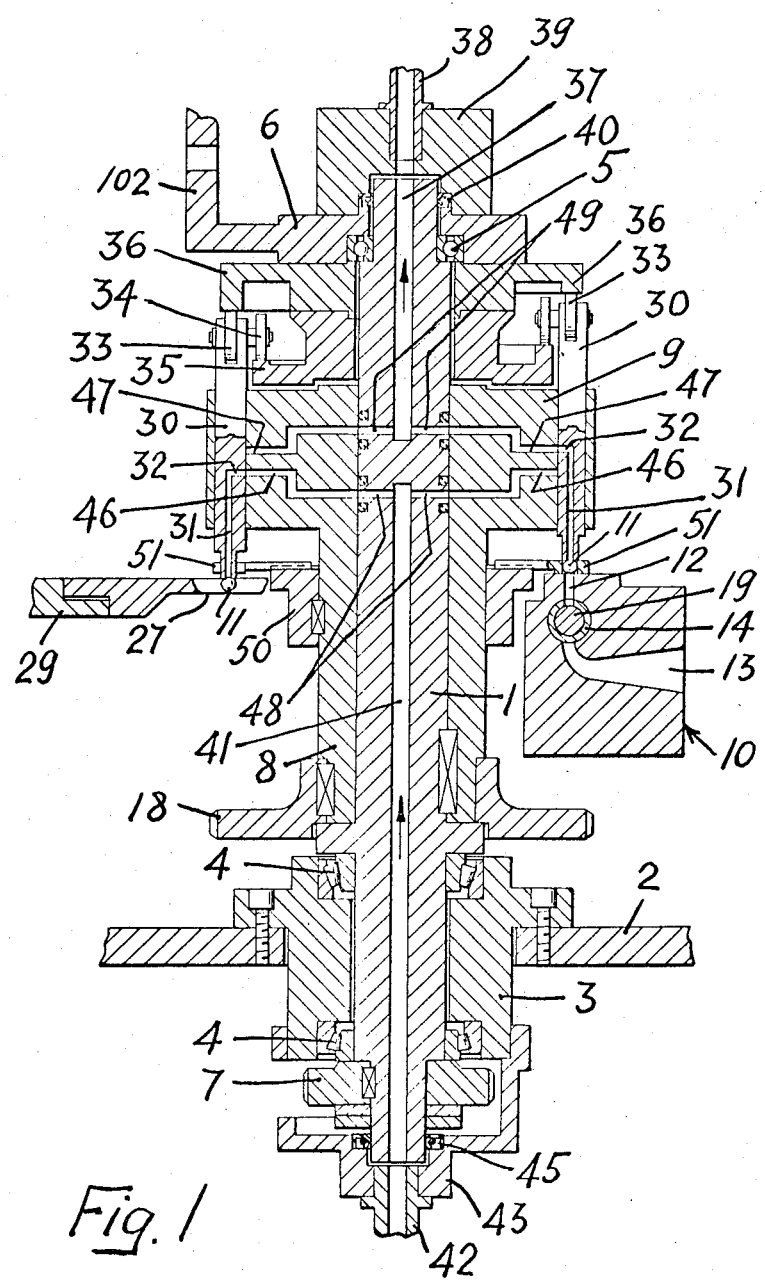
FIG. 1 is a vertical section of a machine for inserting metered amounts of molten thermoplastic material into closure caps.

Referring to the drawings, a machine for inserting metered amounts of thermoplastic material in the molten state, or softened to shaping temperature, into closure caps comprises a vertical shaft 1, the bottom end of which passes through a bearing body 3 fastened on a bottom part 2 of the machine frame, and is rotatably mounted in said bearing body by means of rolling-contact bearings 4. The top end of the shaft 1 is supported by means of rolling-contact bearings 5 by an annular bearing body 6 which, in this example, is integral with a top part 102 of the machine frame. At the bottom end of the shaft 1, which projects from the bearing body 3, there is fastened a gear 7 with the aid of which the shaft 1 is driven rotationally.

Between the two bearing bodies 3 and 6 there is fastened on the shaft 1 a bush 8 provided with a rotating head 9 projecting on all sides in the form of a flange. Beneath the rotating head 9 there is disposed a stationary metering device 10 which at determined intervals of time, corresponding to the working cycle of the machine, delivers an accurately metered amount of molten thermoplastic material in the form of soft or viscous, plastically deformable lumps 11. This metering device is indicated diagrammatically in FIG. 1 and is shown more clearly in FIG. 2. More specifically, the metering device 10 comprises a vertical outlet nozzle 12 for the plastics lumps 11. This outlet nozzle 12 terminates at the top in a plane horizontal surface and at the bottom is connected to a supply pipe 13 for the molten plastics material which is under pressure. Between the outlet nozzle 12 and the supply pipe 13 there is disposed a horizontal tubular closure and metering element 14, which is mounted rotatably in the body of the metering device 10 and passes in the transverse direction through the connecting passage between the outlet nozzle 12 and the supply pipe 13. One end of this closure and metering element 14 passes out of the body of the metering device 10 and is connected by a pair of bevel gears 15, 16 and a gear 17 to a gear 18 fastened on the vertical shaft 1 of the machine. The closure and metering element 14 is consequently rotated synchronously with the vertical shaft 1 and with the rotating head 9 of the machine. The tubular rotating closure and metering element 14 has a lateral inlet and outlet opening 114, which on each rotation is brought cyclically into communication first with the supply pipe 13 when it is in its downwardly directed angular position, and then with the outlet nozzle 12 when it is in its upwardly directed angular position.

An ejector piston 19 adapted to slide to-and-fro and mounted in the body of the metering device 10 engages in the inner open end of the blind bore in the closure and metering element 14. The outer end of the ejector piston 19, projecting out of the metering device 10, is connected by means of a connecting rod 20 to a crank 21 which is driven synchronously with the rotational movement of the closure and metering element 14. For this purpose the shaft 22 of the drive gears 16, 17 of the rotating closure and metering element 14 is connected by a chain drive 23, 24, 25 to the shaft 26 of the crank 21.

The drive conditions are selected so that the following mode of operation is achieved.

Figure 2:
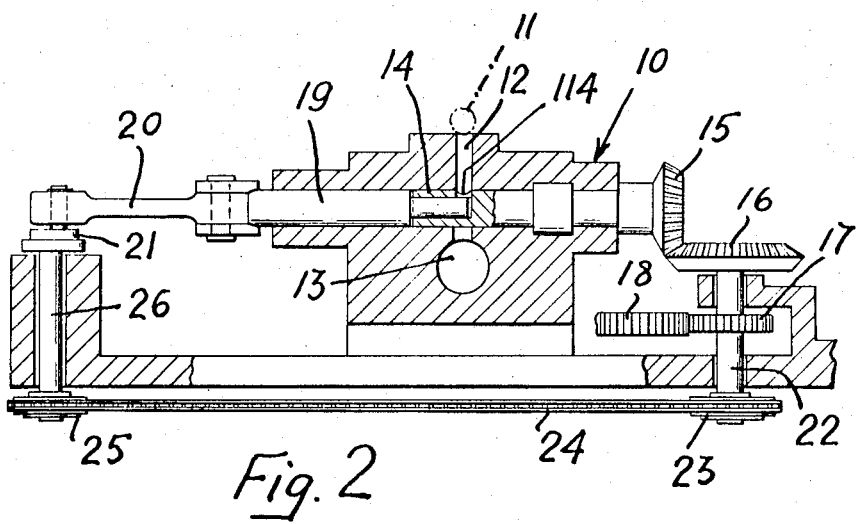
FIG. 2 is a vertical section, perpendicular to the plane of the drawing in FIG. 1, through the metering device of the machine illustrated in FIG. 1.

When the lateral inlet and outlet opening 114 of the closure and metering element 14 is directed downwards and in communication with the supply pipe 13 for the molten plastics material, the ejector piston 19 is partly driven out of the closure and metering element 14 (to the left as shown in FIG. 2), so that there is formed in the element 14 a measuring chamber into which the molten plastics material flows. After a half-revolution of the closure and metering element 14, that is to say when its inlet and outlet aperture 114 is directed upwards and in communication with the outlet nozzle 12, the ejector piston 19 is moved inwards (to the right as shown in FIG. 2) and presses the molten plastics mass, which fills the measuring chamber in the closure and metering element 14 out through the outlet nozzle 12. A soft or viscous lump 11 of plastics material consequently swells out of the top end of the outlet nozzle 12 and projects from the plane horizontal surface of the outlet nozzle 12, as illustrated in dot-and-dash lines in FIG. 2.

In position which is offset angularly to the metering device 10 in relation to the shaft 1 that is to say lying diametrically opposite a closure cap 27, into which the metered amount of plastics material is to be inserted and which lies with its hollow side directed upwards, is in each case positioned beneath the rotating head 9 in rhythm with the operation of the machine. The closure caps 27 may be fed and positioned with the aid of any conveyor means known in themselves. In FIG. 1 there is partly illustrated for this purpose a horizontal rotationally driven feed table 29, which is known in itself and which is provided on its periphery with substantially semicircular recesses, each of which will receive a closure cap 27. The feed table 29 is driven synchronously with the rotating head 9 in such a manner that in each case one of its peripheral recesses containing the respective closure cap 11 will be positioned under the rotating head 9, the centre line or centre point of said cap lying on the same pitch circle of the outlet nozzle 12 of the metering device 10. The synchronous movement can for example be obtained by deriving the drive of the feed table 29 from the rotary movement of the shaft 1 by way of the gear 18 fastened on the bottom end of the shaft 1.

In eccentric vertical insertion bores passing through the rotating head 9 there are mounted corresponding vertical suction pins 30 which are adapted to slide up and down but are non-rotatable and which project out of the rotating head 9 both in the downward and in the upward direction. The bottom end of each suction pin 30 is provided with a longitudinally directed blind bore 31 which ends at the bottom in the bottom face of the pin and at the top is in communication with a transverse passage 32. This transverse passage 32 is directed radially in relation to the shaft 1 and ends on the side surface of the suction pin 30 facing said shaft 1. The top end of each suction pin 30 carries two sensing rollers 33, 34, each of which co-operates with an associated annular cam track 35 and 36 respectively which are fastened on the top part 102 of the machine frame. The cam track 35 is disposed beneath and the cam track 36 above the pair of sensing rollers 33, 35, so that they move the suction pin 30 up and down by constraint.

In the shaft 1 there is provided a coaxial blind bore 37 which extends from its top end and constitutes a vacuum bore and the top end of which is in communication with the suction pipe 38 of an air pump (not illustrated).

For this purpose use may be made of any rotating connections known in themselves. In this example the top end of the shaft 1, projecting out of the respective bearing body 6, engages in a stationary hood-shaped connecting member 39 which is fastened to the bearing body 6 and in communication with the suction pipe 38. A sealing ring 40 provides the seal between the connection member 40 and the shaft 1.

In addition, there is provided in the shaft 1, extending from its bottom end, a coaxial blind bore 41 which constitutes a blast bore and the bottom end of which is in communication with the delivery pipe 42 of an air pump (not illustrated). The bottom end of the shaft 1, projecting out of the respective bearing body 3, is likewise engaged in the stationary pan-shaped connection member 43 which is fastened on the bearing body 3 and in communication with the pressure pipe 42. The seal is provided by a sealing ring 45 disposed between the shaft 1 and the connection member 43.

In the region of each suction pin 30 there are provided in the rotating head 9 two radial transverse bores which are spaced apart and disposed one above the other and which terminate in the vertical insertion bore in the respective suction pin 30 on the inner wall of the insertion bore, facing the transverse passage 32 in the suction pin 30. The bottom transverse bore 46 of the rotating head 9 is in communication through a transverse bore 48 provided for it in the shaft 1 with the longitudinally directed blast bore 41 in the shaft 1. The upper transverse bore 47 of the rotating head 9 on the other hand is in communication through a transverse bore 39 provided for it in the shaft 1 with the longitudinally directed vacuum bore 37 in the shaft 1. When the suction pin 30 is lifted by the bottom cam track 35 with the aid of the sensing roller 34 into an upper end position (receiving position) the transverse passage 32 of the suction pin 30 is in communication with the top transverse bore 46 of the rotating head 9 and consequently with the vacuum bore 37 of the shaft 1, as illustrated for the right-hand suction pin 30 in FIG. 1. When on the other hand the suction pin 30 is lowered by the upper cam track 36 through the sensing roller 33 into a bottom end position (delivery position), the transverse passage 32 of the suction pin 30 comes into communication with the bottom transverse bore 46 of the rotating head 9 and consequently with the blast bore 41 of the shaft 1, as illustrated for the left-hand suction pin 30 in FIG. 1.

Figure 3:
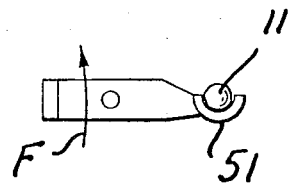
FIG. 3 is a plan view of a stripping finger, one such being provided for each suction gripper of the machine illustrated in FIG. 1.

Under each suction pin 30 there is fastened on a flange 50 on the rotating head bush 8 a stripping finger 51 which is curved substantially semicircularly in the horizontal plane and is disposed substantially coaxially to the respective suction pin 30. These stripping fingers 51 thus rotate together with the rotating head 9 or together with the respective suction pins 30 and have their open sides directed forward in the direction of rotation F, as illustrated particularly in FIG. 3. In addition, the stripping fingers 51 are disposed as such a height that in the rotating movement they move as close as possible past the top plane surface of the outlet nozzle 12 of the metering device 10, but on the other hand at a certain, although short distance from the top edge of the closure cap 27.

The arrangement is such that the following mode of operation is obtained.

Shortly after a soft or viscous plastics lump 11 has swollen out of the outlet nozzle 12 of the metering device 10, one of the suction pins 30 is positioned coaxially to the outer nozzle 12 above the projecting plastics lump 11. The suction pin 30 assumes its upper, raised end position (receiving position) in which the bottom end surface of its stepped, i.e. the narrower end portion lies close above the plastics lump 11, beneath which the stripping finger 51 engages, this position preferably being approximately at the height of the top edge of the stripping finger 51, and at the same time the longitudinal bore 31 of the suction pin 30 is in communication with the vacuum bore 37 on the shaft 1 through the transverse passage 32 and the upper transverse bore 47 in the rotating head 9, as illustrated in particular in the right-hand half of FIG. 1.

Consequently, the plastics lump 11 is seized by the suction pin 30 through suction action and on the further rotary movement of the rotating head 9 in the direction of the arrow F is cut off by the stripping finger 51 from the remainder of the viscous plastics material filling the outlet nozzle 12, that is to say stripped off from the plane surface of the outlet nozzle. For this purpose the bottom edge of the stripping finger 51, that is to say the front edge in the direction of rotation F, is preferably in the form of a sharp edge.

The plastics lump 11 removed in this manner from the metering device 10 by the suction pin 30, hanging on said suction pin, held fast thereto by the action of suction, and lying substantially in the groove in the stripping finger 51 is transported by the rotary movement of the rotating head 9 until the suction pin 30 together with the plastics lump 11 takes up position substantially centrally above the closure cap 27. The suction pin 30 is then lowered into its bottom end position (delivery position), in which its bottom end or the plastics lump 11 hanging thereon is inserted into the closure cap 27 and at the same time the longitudinal bore 31 of the suction pin 30 is in communication with the blast bore 41 in the shaft 1 by way of the transverse passage 32 and the bottom transverse bore 36 of the rotating head 9, as illustrated particularly in the left-hand half of FIG. 1. Consequently, the plastics lump 11 is detached from the suction pin 30 by the blast air, that is to say is blown off and deposited or dropped into the closure cap 27. The suction pin 30 is then, if necessary, raised until it can be moved without obstruction over the top edge of the closure cap 27 on the further rotation of the rotating head 9. The invention is naturally not restricted to the example of embodiment illustrated, but within the framework of the general principle of the invention a number of solutions which differ from one another, particularly in respect of construction are possible. Thus, for example, the vertical suction pins 30 may be carried by an endless conveyor chain or the like rotating in a horizontal plane on any desired path. In addition, the two transverse bores 46, 47 in the rotating head 9, which are associated with each suction pin 30, may be replaced by two corresponding annular passages which intersect the vertical insertion bores of all the suction pins and are in communication through respective radial transverse bores in the rotating head 9 and in the shaft 1 with the vacuum bore 37 and with the blast bore 41 in the shaft 1 respectively. In another alternative embodiment the two transverse bores 46, 47 provided for each suction pin 30 in the rotating head 9 may be in communication with respective annular passages formed, for example, between the shaft 1 and the rotating head 9, said passages being in communication with the vacuum bore 37 and with the blast air bore 41 respectively through a single corresponding transverse bore 48 or 49 respectively, provided for example in the shaft. Finally, the suction grippers for the plastics lumps 11 need not necessarily be in the form of vertically slidable suction pins, but may for example comprise rockably mounted suction arms or suction levers.

I claim:

1. A machine for inserting metered amounts of molten thermoplastic materials into closure caps, comprising a metering and delivery device for viscous or softened plastics lumps, at least one suction gripper mounted for cyclic movement along a closed path between a first position at which the gripper is disposed above said metering and delivery device and a second position at which the gripper is disposed centrally above an empty closure cap, the hollow side of which is directed upwards, a vacuum pipe which communicates with the gripper when the gripper is in the region of said first position for effecting reception by the gripper of one of said plastics lumps delivered by said metering device, and a blast air pipe which communicates with the gripper when the gripper is in the region of said second position for the purpose of discharging the said one plastics lump into the closure cap, said suction gripper being mounted for reciprocal vertical movement in a controlled manner so that in the region of the metering device the suction gripper lies as close as possible above the plastics lump delivered by said device, whereas in the region of the closure cap the bottom end of the suction gripper and/or at least the plastics lump hanging down and held fast by suction action engages for a short time in said cap, said suction gripper comprising a vertical suction pin mounted for longitudinal displacement non-rotatably within an eccentric insertion bore in a rotating head rotatable about a vertical axis, and which projects out of said head both in a downward and in an upward direction, said suction pin being provided with a longitudinal bore which terminates at its bottom end and which in the region of the metering device communicates with the vacuum pipe and in the region of the closure cap communicates with the air blast pipe, and said suction pin being adapted to be raised by annular stationary cam tracks disposed above said rotating head and cooperating follower rollers on the top end of the suction pin, in the region of the metering device into a receiving position in which the suction pin lies close above the plastics lump delivered by said device, and in the region of the closure cap being adapted to be lowered into a discharge position in which it is close to or engages in said cap.

2. A machine according to claim 1, wherein the rotating head has a vertical shaft provided with a longitudinally directed blind vacuum bore extending from the top end of the shaft and with a longitudinally directed blind blast air bore extending from the bottom end of the shaft, and two transverse bores provided in the rotating head and spaced apart one above the other and laterally of an insertion bore in the suction pin, the top transverse bore communicating with the vacuum bore and the bottom transverse bore communicating with the blast air bore in the shaft, while a longitudinal bore in the suction pin communicates at its top end with a transverse passage which terminates at the side wall of said end and which in the raised receiving position of the suction pin communicates with the top transverse bore of the rotating head and consequently with the vacuum bore in the shaft, but in the lowered discharge position of the suction pin communicates with the bottom transverse bore in the rotating head and consequently with the blast air bore in the shaft.

3. A machine according to claim 2, wherein the metering device is provided with an upwardly directed outlet nozzle for the viscous or softened plastics lumps, and that beneath the suction gripper there is disposed a stripping finger which moves together with said suction gripper and is curved, for example substantially semicircular in shape, and which is open at the front in the direction of movement of the suction gripper, said stripping finger moving as close as possible past the outlet nozzle of the metering device but moving past the closure cap at a distance from the upper edge of the closure cap and preferably having a bottom front edge in the form of a sharp edge.

4. A machine according to claim 3, wherein the bottom end of the suction gripper in the receiving position lies at a height above the bottom edge of the stripping finger corresponding approximately to the thickness of the delivered plastics lump, but in the lowered discharge position engages through the groove in the stripping finger.

5. A machine according to claim 3, wherein the metering device comprises a tubular rotating closure and metering element which passes in the transverse direction through the connecting passage between the outlet nozzle for the viscous or softened plastics lumps and a supply pipe for the molten plastics material, and is provided on its peripheral surface with an inlet and outlet aperture which alternately communicate with the supply pipe and with the outlet nozzle.

6. A machine according to claim 5, wherein an ejector piston which is coaxial to a blind longitudinal bore in the tubular closure and metering element and is adapted to slide to-and-fro engages in said longitudinal bore and is partly driven out of the closure and metering element when the inlet and outlet aperture of said device is in the angular position in which it communicates with the supply pipe, and thus leaves free a measuring chamber in connection with the inlet and outlet aperture, whereas in the angular position of the inlet and outlet aperture of the closure and metering element in which said aperture communicates with the outlet nozzle it is moved into said closure and metering device and thus presses out through the outlet nozzle the molten plastics material introduced into the measuring chamber.

7. A machine according to claim 6, wherein drive means for the rotating closure and metering element and the slidable ejector piston are coupled together and are also coupled to the vertical shaft of the rotating head.

References Cited

UNITED STATES PATENTS

| | | | |
|---|---|---|---|
| 3,450,441 | 6/1969 | Vogt | 222—194 |
| 2,536,299 | 1/1951 | Martin | 141—248 |
| 2,540,059 | 1/1951 | Stirn et al. | 141—67 |
| 1,052,654 | 2/1913 | Crowley | 222—194 |
| 3,587,671 | 6/1971 | Gamberini | 141—67 |

FOREIGN PATENTS

| | | | |
|---|---|---|---|
| 613,781 | 12/1960 | Italy | 141—67 |

HOUSTON S. BELL, JR., Primary Examiner

U.S. Cl. X.R.

137—624.13, 624.18; 141—147, 187, 248; 222—194